(12) United States Patent
Rosenholtz

(10) Patent No.: US 7,130,461 B2
(45) Date of Patent: Oct. 31, 2006

(54) SYSTEMS AND METHOD FOR AUTOMATICALLY CHOOSING VISUAL CHARACTERISTICS TO HIGHLIGHT A TARGET AGAINST A BACKGROUND

(75) Inventor: Ruth E. Rosenholtz, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 844 days.

(21) Appl. No.: 10/321,662

(22) Filed: Dec. 18, 2002

(65) Prior Publication Data

US 2004/0120574 A1 Jun. 24, 2004

(51) Int. Cl.
*G06K 9/00* (2006.01)
(52) U.S. Cl. ............ 382/165; 382/162; 382/219; 358/518; 345/691
(58) Field of Classification Search .......... 382/162, 382/165, 166, 167, 170, 107, 219, 228, 272, 382/274; 345/207, 690, 691; 358/518, 519, 358/520, 521, 522, 523
See application file for complete search history.

(56) References Cited

U.S. PATENT DOCUMENTS

| 6,870,956 | B1 * | 3/2005 | Qi et al. | 382/170 |
| 6,934,415 | B1 * | 8/2005 | Stentiford | 382/205 |
| 2004/0017393 | A1 * | 1/2004 | Easwar | 345/744 |

OTHER PUBLICATIONS

R. Rosenholtz, "Search Asymmetries? What Search Asymmetries?", *Perception and Psychophysics*, 63(3), 476-489, 2001.

A. Woodruff, et al., "Using Thumbnails to Search the Web", *SIGCHI 2001*, 198-205, 2001.
R. Rosenholtz, et al., "Perceptual Adaptive JPEG Coding", *IEEE Intl. Conf. On Image Processing*, Lausanne, Swiz., Sep. 1996.
R. Rosenholtz, "A Simple Saliency Model predicts a number of Motion Popout Phenomena", *Vision Research* v. 39, 1999, pp. 3157-3163.
M. Foltz, et al., "Query by Attention: Visually Searchable Information Maps", *Proc. of the Fifth Intl. Conf. on Information Visualization* (Info Vis), London, 2001.
B. Gibson, et al., "Surprise! An Unexpected Color Singleton Does Not Capture Attention in Visual Search,", *Psychol. Sci.*, v. 9, No. 3, May 1998, pp. 176-182.

* cited by examiner

*Primary Examiner*—Jingge Wu
*Assistant Examiner*—Ali Bayat
(74) *Attorney, Agent, or Firm*—Oliff & Berridge, PLC

(57) ABSTRACT

A method for choosing visual characteristics of a characteristic space within a region includes calculating a mean characteristic of the region, determining a covariance of the region, inverting the covariance to produce an inverse covariance, estimating a target characteristic, determining a difference between the mean characteristic and the target characteristic transposing the difference to produce a difference transpose, determining a saliency from a product of the difference transpose multiplied by the inverse covariance multiplied by the difference, comparing the saliency to an acceptance criterion to yield one of an acceptance if the saliency satisfies the acceptance criterion and a rejection otherwise, adjusting the target characteristic and repeating the determining a difference, transposing the difference, determining a saliency and comparing the saliency steps if the comparing yields the rejection, and outputting the target characteristic if the comparing yields the acceptance.

39 Claims, 11 Drawing Sheets
(6 of 11 Drawing Sheet(s) Filed in Color)

FIG. 7
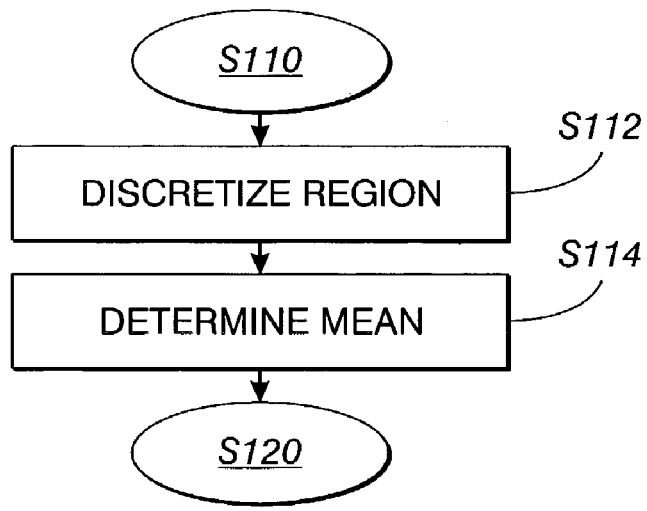
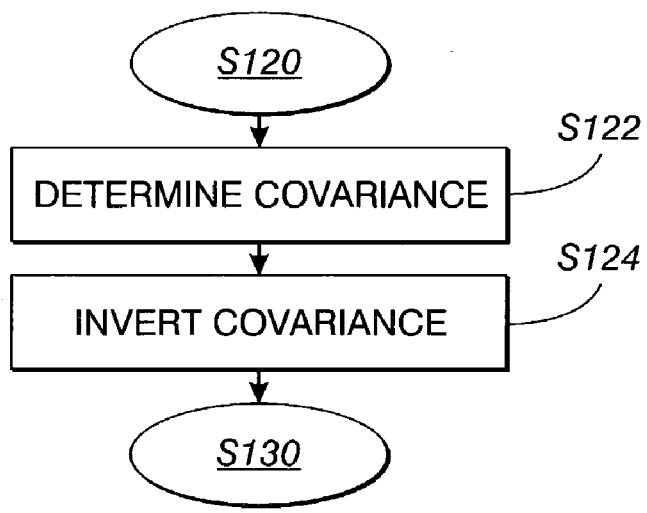
FIG. 8

FIG. 9
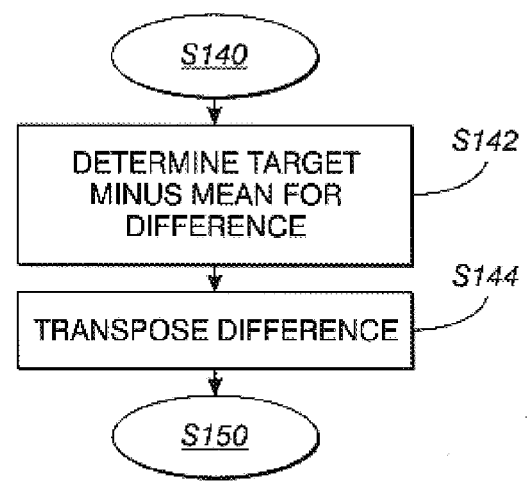
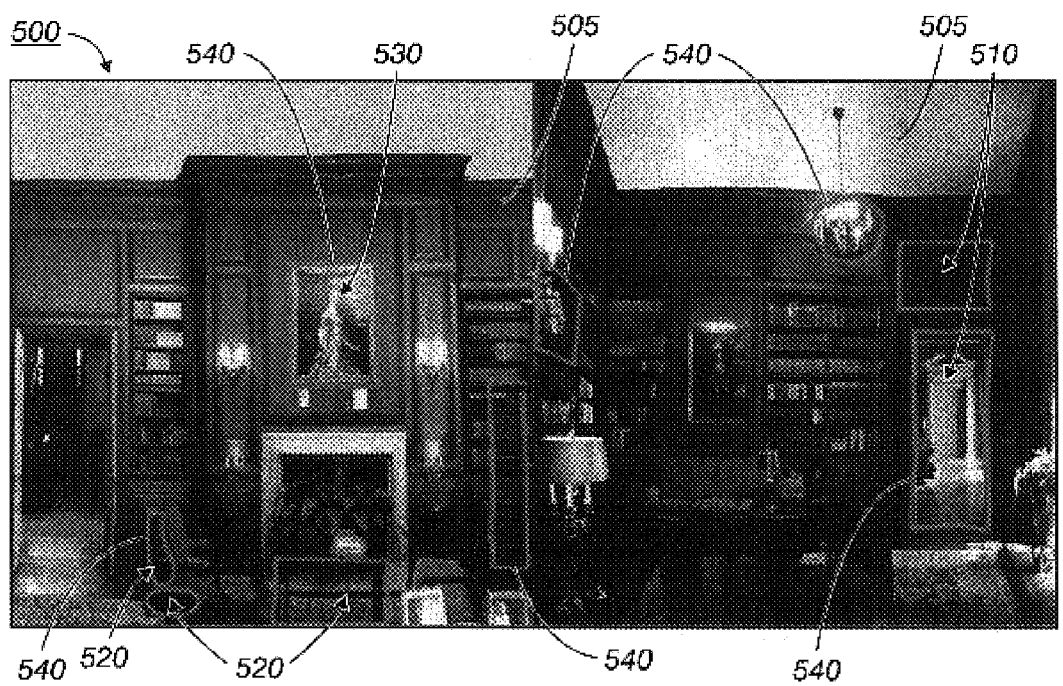
FIG. 10

FIG. 11
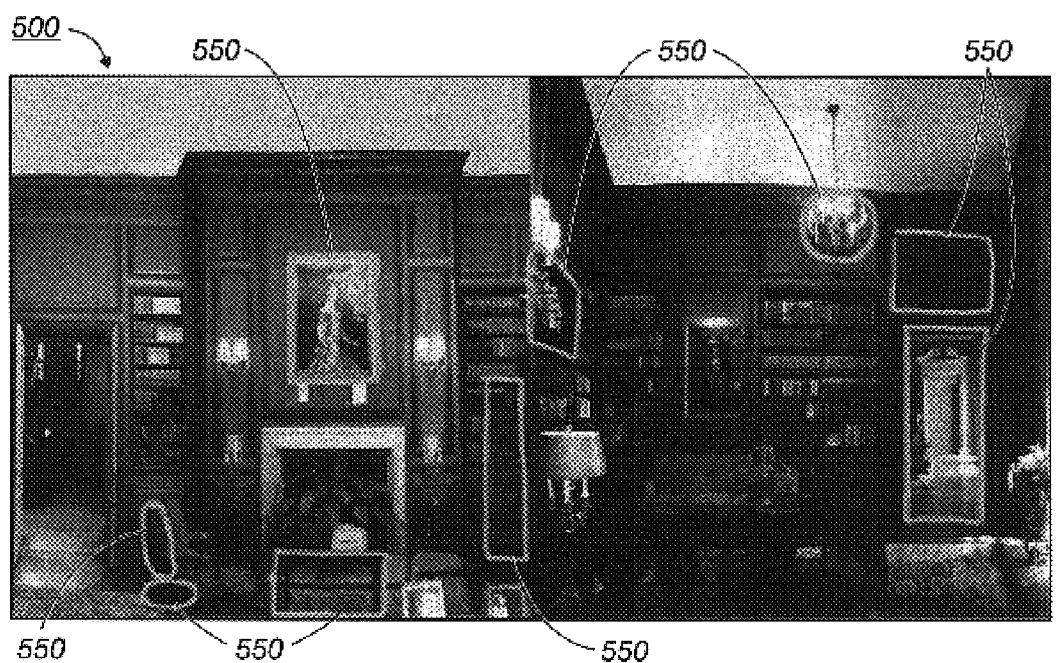
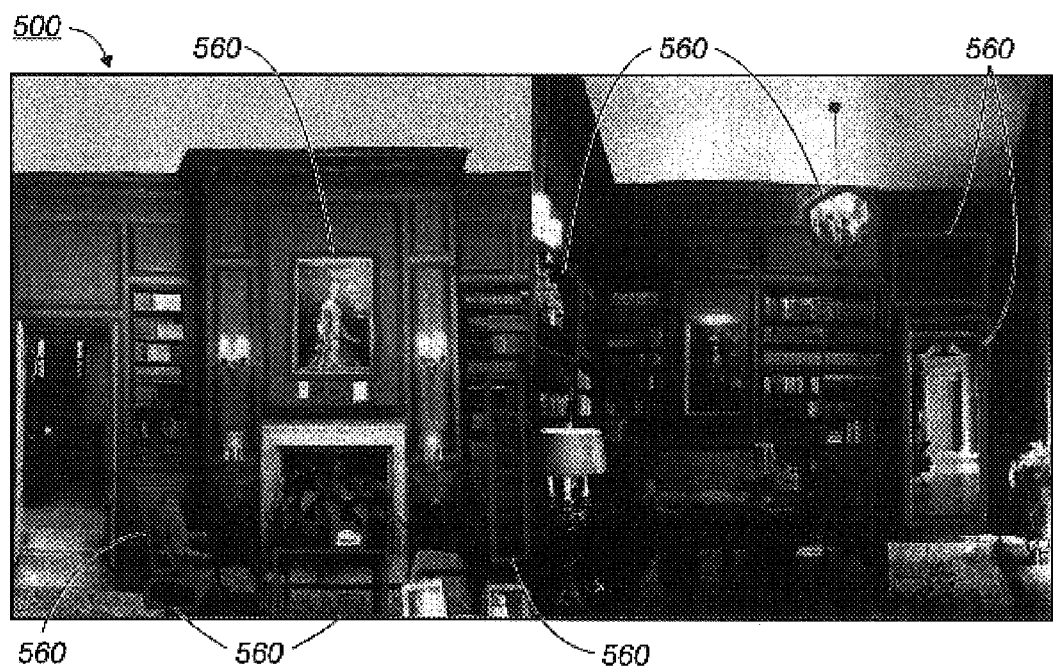
FIG. 12

FIG. 13
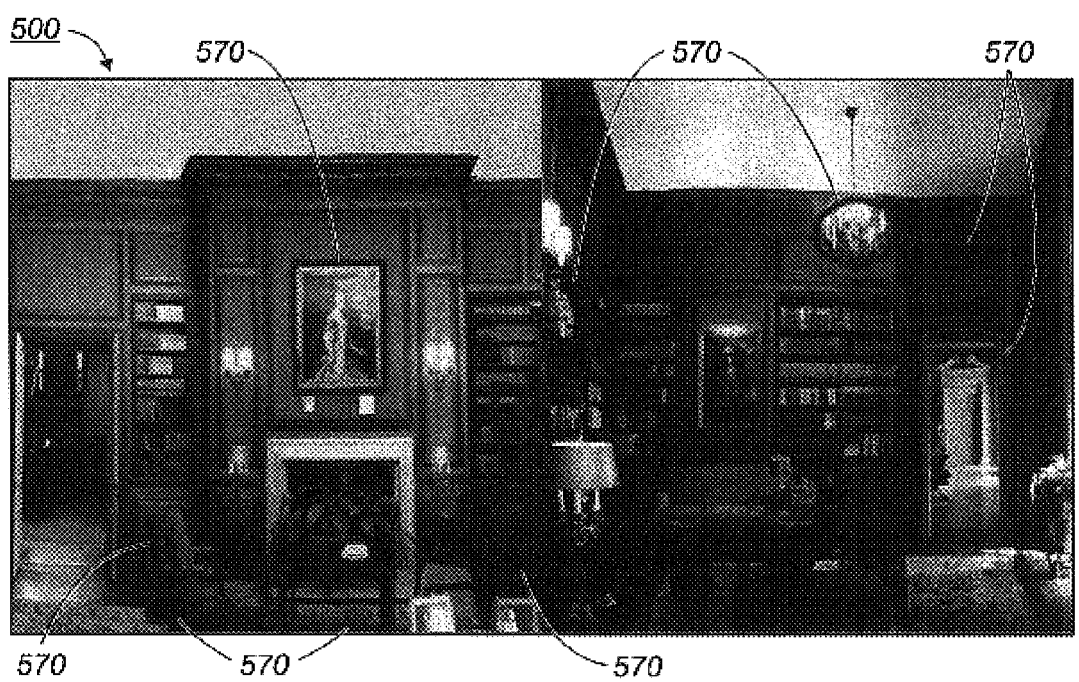
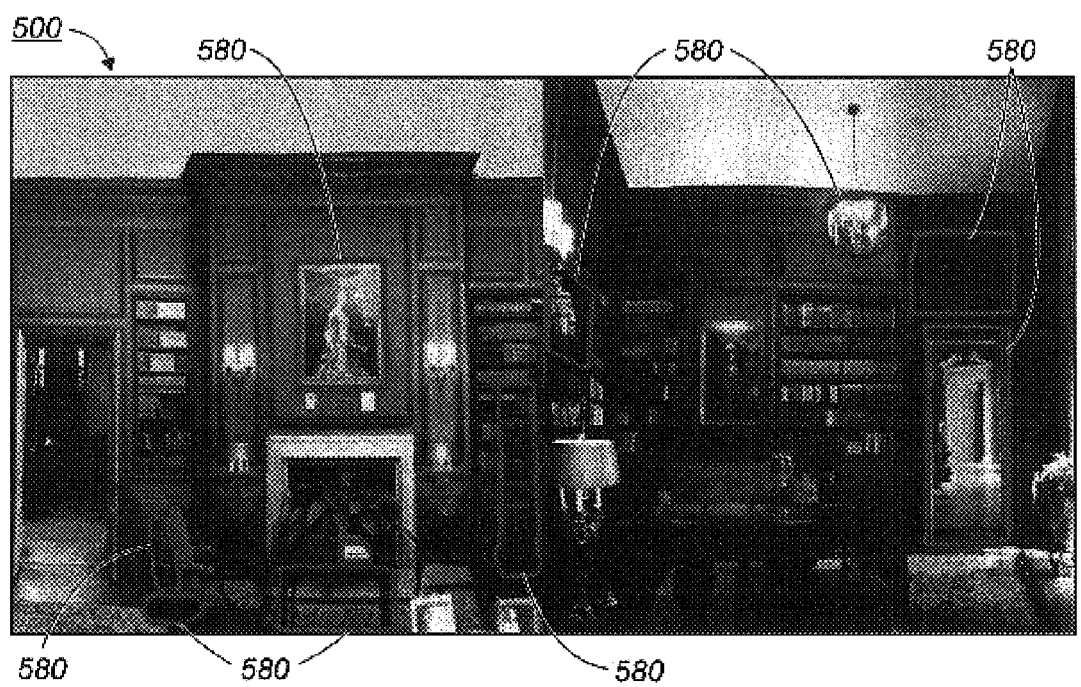
FIG. 14

SYSTEMS AND METHOD FOR AUTOMATICALLY CHOOSING VISUAL CHARACTERISTICS TO HIGHLIGHT A TARGET AGAINST A BACKGROUND

The patent or application file contains at least one drawing executed in color. Copies of this patent or patent application publication with color drawings will be provided by the office upon request and payment of the necessary fee.

BACKGROUND OF THE INVENTION

1. Field of Invention

This invention relates generally to visual characteristics of documents displayed to a observer.

2. Description of Related Art

The expansion of visually intensive web pages on the Internet has encouraged efforts to draw attention to a particular item on display. Such methods have included time-varying visual stimuli, such as flashing or animated icons, or audio stimuli, such as beeps. As users have become more experienced, such stimuli can cause annoyance rather than attraction.

More recent developments have led to more subtle methods for distinguishing a particular item on displayed documents, such as a web page. One such method includes highlighting a particular item with a surrounding block of a color that contrasts with the background as well as with the item. In various exemplary embodiments, the item can be enveloped by an outline in a color that contrasts with the background.

An appropriate color to be used in this method can be confidently selected by a person having experience in graphics arts and sufficient time to make a judicious evaluation based on the characteristics of the background and the item to which attention should be drawn.

SUMMARY OF THE INVENTION

However, the services of a graphic artist are often either unavailable or unaffordable. This may occur because the budget for a project does not allow for a graphic artist. This may also occur because the size of the project may be too large to allow a graphic artist to effectively review and revise all of the documents, or the project may involve a dynamically-changing display, complicating efforts by a graphic artist to account for all possible appearances of that display.

It would be useful for systems and methods to automatically select a visual characteristic parameter of a target against a background to facilitate a viewer to distinguish and direct attention to the target. Such systems and methods would mitigate the attention-diverting influence of distractors in the background.

Such a visual characteristic parameter could include a particular color hue, shade, texture, size, shape or motion set to a particular value. Such a selection can be based on saliency between the target and the background. Such systems or methods could expedite the selection of visual characteristics in a wide variety of applications at reduced cost from manual operation.

This invention provides systems, methods and tools for automatically recommending a color or alternate visual distinction to an observer of a document so that attention is directed to a particular document item within a background. In various exemplary embodiments, a display can include visual rendering exhibited on a printed page, a computer monitor, a PDA screen, a cockpit instrument, or the like.

This invention separately provides systems and methods that automatically select visual characteristics that provide distinction and thus draw attention of the viewer.

This invention separately provides systems and methods for choosing visual characteristics of a characteristic space within a region.

In various exemplary embodiments of the systems and methods according to this invention, a saliency is determined based on an inverse covariance of the region. A difference is determined between a target characteristic and a mean characteristic of the region. The saliency is compared against an acceptance criterion to yield one of an acceptance if the saliency satisfies the acceptance criterion and a rejection if it does not. The target characteristic is then adjusted. These steps are then repeated if the acceptance criterion is not satisfied. The target characteristic is output once the acceptance criterion is satisfied.

In various exemplary embodiments, the systems and methods according to this invention determine the saliency by first determining a mean characteristic of the region. A covariance of the region is then determined. The covariance is inverted to produce an inverse covariance. A target characteristic is estimated based on a difference in the opposite direction along a coordinate between the coordinate midpoint and the mean of the region. A difference between the mean characteristic and the target characteristic is then determined. The difference is transposed to produce a difference transpose. A product of the difference transpose multiplied by the inverse covariance multiplied by the difference is used to determine the saliency.

In various exemplary embodiments, the characteristic space has a single coordinate. In this case the mean characteristic, the covariance and the target characteristic each have a scalar element. In various exemplary embodiments, the characteristic space has a plurality of coordinates. In these cases, the mean characteristic is a vector having vector elements, the covariance is a matrix having tensor elements, and the target characteristic is a vector having vector elements. In various exemplary embodiments, the mean characteristic has a weighting factor that is multipled with each vector element for each coordinate of the plurality of coordinates. In various exemplary embodiments, the mean characteristic has a bias factor that is added to each vector element for each coordinate of the plurality of coordinates. In various exemplary embodiments, the covariance has a noise factor.

These and other features and advantages of this invention are described in, or are apparent from, the following detailed description of various exemplary embodiments of the systems and methods according to this invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various exemplary embodiments of the methods of this invention will be described in detail with reference to the following figures, wherein:

FIG. 7 is a flowchart outlining in greater detail one exemplary embodiment of the method for characterizing the region of FIG. 6 according to this invention.

FIG. 8 is a flowchart outlining in greater detail one exemplary embodiment of the method determining the inverse covariance of FIG. 6 according to this invention.

FIG. 9 is a flowchart outlining in greater detail one exemplary embodiment of the method for determining the difference between a target and a mean of FIG. 6 according to this invention.

FIG. 10 is a first exemplary embodiment of a photograph having outlines around selected objects, according to this invention where the selected color is determined to be a poor choice;

FIG. 11 is a second exemplary embodiment of a photograph having outlines around selected objects, according to this invention where the selected color is determined to be a poor choice;

FIG. 12 is a third exemplary embodiment of a photograph having outlines around selected objects, according to this invention where the selected color is determined to be a poor choice;

FIG. 13 is a first exemplary embodiment of a photograph having outlines around selected objects, according to this invention where the selected color is determined to be a good choice;

FIG. 14 is a second exemplary embodiment of a photograph having outlines around selected objects, according to this invention where the selected color is determined to be a good choice;

DETAILED DESCRIPTION OF EXEMPLARY EMBODIMENTS

Recommending a particular color or alternate visual distinguishing characteristic for directing a viewer's attention to a target despite distracting clutter in the background uses information gathered from studies in human visual response. The target can represent an icon or a text or a highlight to envelope the icon or text to be made prominent. The distracting features can be the background or distractors within that mask portions of the background.

Research in human vision shows that saliency, as characterized by the strength to grab attention (a) increases as a target becomes more distinguishable from distractors, and (b) decreases as the visibility or "spread" of the distractors enlarges. In various exemplary embodiments, the characteristics include colors selected from an available palette. In various other exemplary embodiments, the characteristics include alternate features providing visual distinction.

A well-chosen stimulus feature can facilitate human visual discrimination between a target and a plurality of distractors for drawing stimulus-driven attention. Such attention results from the characteristics of the stimulus, as distinct from items that draw attention due to semantic value for the observer. A stimulus for drawing attention to the icon or the text or to some other item can include distinctions or cyclic alterations in size, shape, color, opacity, hue (or tint), saturation (or chroma), value (or luminance/shade), luminosity (or brightness), surface texture (e.g., watermark, specular or diffuse reflectivity, moire), focus (sharp, soft), relative position, motion speed and/or motion direction.

In various exemplary embodiments, the visual characteristic used to provide distinction is color, leading to a search for an available color having an acceptable saliency. To identify an appropriate color, the systems and methods according to this invention represent the colors in a scene or corpus within an appropriate color space or color coordinate system. This appropriate color space is ideally a perceptually meaningful one for human response, although colors can be mapped into any appropriate color space. In various exemplary embodiments, the color space to be selected is CIELAB based on the Commission Internationale de l'Eclairages 1976 orthogonal coordinates $L^*a^*b^*$. The lightness $L^*$ represents a relative gray scale between black and white. Two opposing scales represent the hue and chroma. The $a^*$ scale quantifies hues red by a+ and green by a−. The $b^*$ scale quantifies hues yellow by b+ and blue by b−. The absolute values of $a^*$ and $b^*$ correspond to the chroma.

In various exemplary embodiments, a multidimensional feature space can be defined, such as a visual coordinate system for a dynamic simulation. Such a characteristic space could include at least four coordinates w–z, where w is the luminance, x is the hue, y is the saturation and z is the velocity (directional or absolute).

Figure 1:
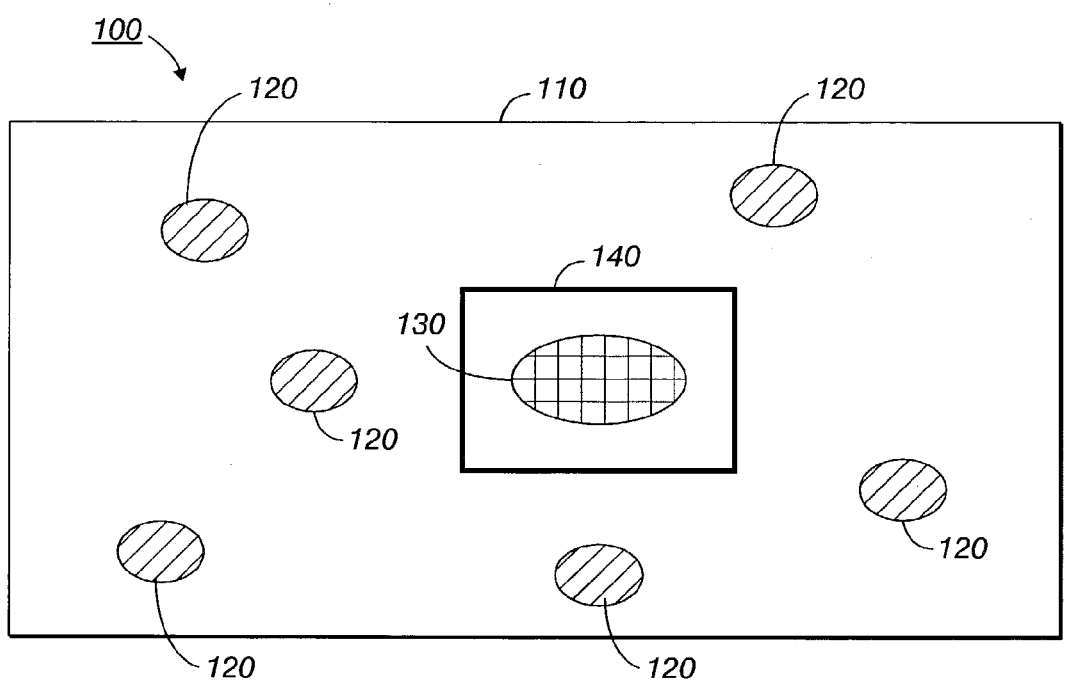
FIG. 1 illustrates one exemplary embodiment of a displayed document having a target against a background, with an outline circumscribing the target.

FIG. 1 shows a first exemplary embodiment of a document 100 having a background 110. Within the document 100 and superimposed on the background 110 are one or more distractors 120 and an object 130 to which attention is to be drawn. The document 100 can represent a web page, defined, for example, using html or xml, a photograph, a video game display, a viewgraph document, a word-processing character string, or a set of coded instructions.

The object 130 and the background 110 have one or more separate patterns, textures, colors and/or other visually perceptible characteristics. The distinctions in shape and pattern between the object 130 and the distractors 120, as shown in FIG. 1, is rendered artificially significant for illustrative purposes only, and is not limiting. Circumscribing the object 130 is an outline 140 representing the target. The outline 140 has a pattern, color and/or other visual characteristic selected to contrast against the background 110 and the distractors 120. The primary criterion for selecting the visual characteristic of the outline 140 includes facilitating of drawing of the observer's attention to the object 130. For a static display document, such as a web page, a choice of color could provide sufficient distinction to draw the observer's attention. In various exemplary embodiments, in a moving display, such as in an open loop dynamic simulation, a time-varying parameter, such as position could be used to draw the observer's attention.

Figure 2:
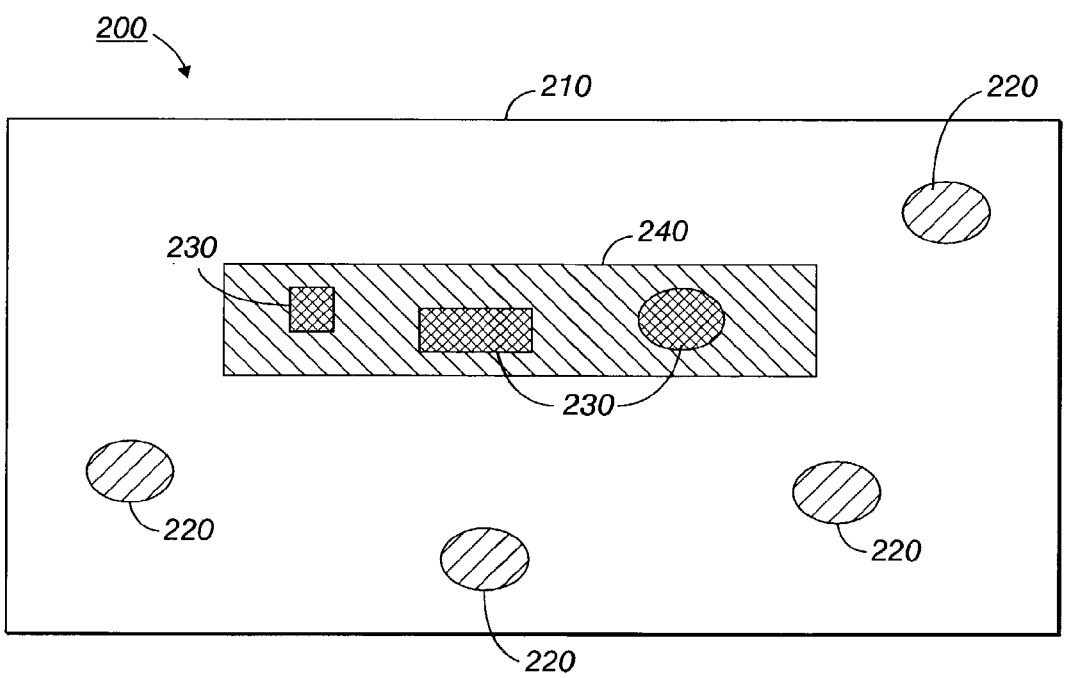
FIG. 2 illustrates one exemplary embodiment of a displayed document having a target against a background, with a highlight surrounding the target.

FIG. 2 shows a second exemplary embodiment of a document 200 having a background 210 having distractors 220. A foreground 230 appears in the document 200 against the background 210. The background 210 and the foreground 230 have separate patterns, colors and/or other visual characteristics. A highlight 240, representing the target, surrounds the foreground 230 with a particular visual characteristic. The visual characteristic for the highlight 240 is selected to contrast against both the background 210 with the distractors 220 and the foreground 230. In various exemplary embodiments, instead of the highlight 240, the target could be represented by the foreground 230, with a visual characteristic selected to improve the contrast and/or some related quality.

The criteria for the visual characteristic selection include facilitating drawing the observer's attention to the foreground 230, as well as avoiding obscuring the foreground 230. For a foreground 230 that includes text, a visual characteristic the highlight 240 is selected to create adequate contrast between the foreground 230 and the highlight 240 to improve the readability of the text. In other circumstances, the contrast between the highlight 240 and the background 210 can provide the basis of saliency.

Generally, in various exemplary embodiments, the visual characteristic for the outline 140 or highlight 240 is automatically chosen to draw attention to the outline or highlight. Selecting the visual characteristic is based on the visual characteristics of the object 130, the backgrounds 110 and 210, the foreground 230, and/or the distractors 120 and 220.

The prominence or saliency of a particular target visual characteristic is determined such that the higher the saliency, the more the visual characteristic draws the observer's attention when that visual characteristic appears in a display having other displayed visual characteristics, such as the visual characteristics of the object, the background, the foreground and/or any distractors. A visual characteristic can be selected automatically, or a number of visual characteristic choices can be provided to the observer. In various exemplary embodiments, the visual characteristic is color, to be selected from an available palette within a gamut that can be rendered to display the document.

Figure 3:
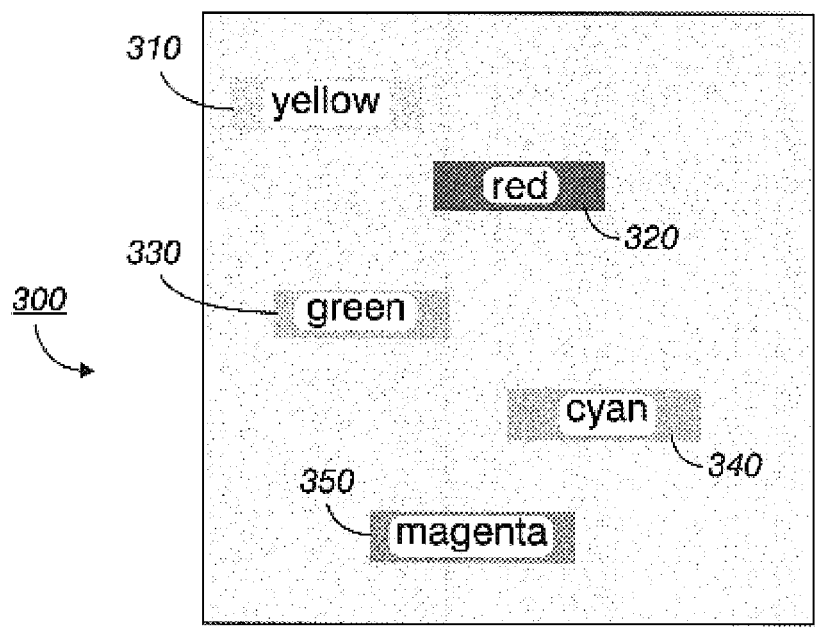
FIG. 3 is one exemplary embodiment of a collection of colors from which a target color can be selected for a highlight, an outline or the target according to this invention.

FIG. 3 represents a set of colored regions 300 illustrating one exemplary embodiment of a set of candidate hues. These hues include yellow 310, red 320, green 330, cyan 340 and magenta 350, although others can be substituted for or added to these hues as desired, thus facilitating readability of the dark text highlighted by these colors. The colors shown in the group 300 resemble colors in highlight pens.

Figure 4:
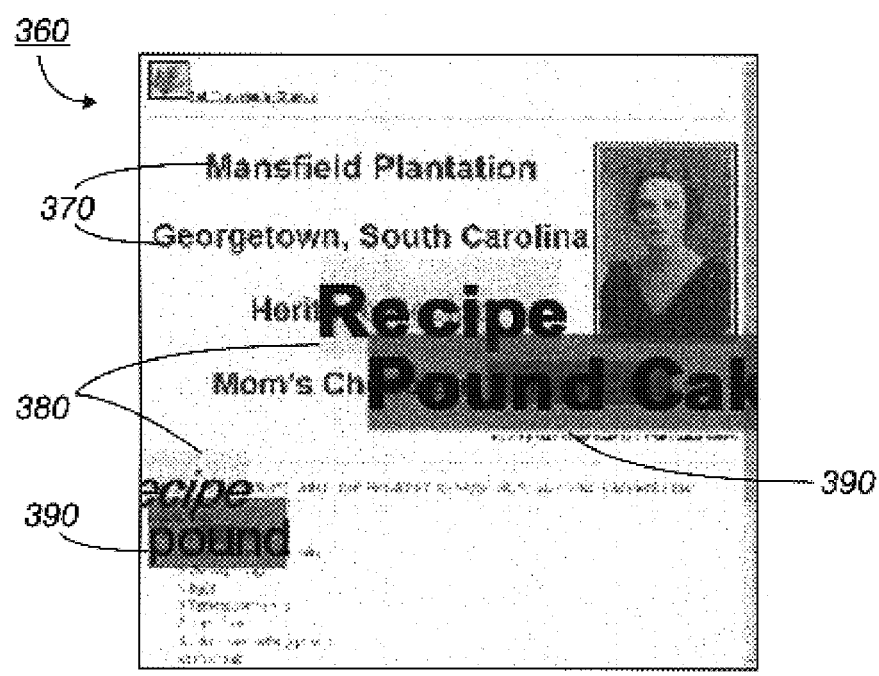
FIG. 4 is a first exemplary embodiment of a desaturated color document with the text being displayed using callouts and/or overlays according to this invention.
Figure 5:
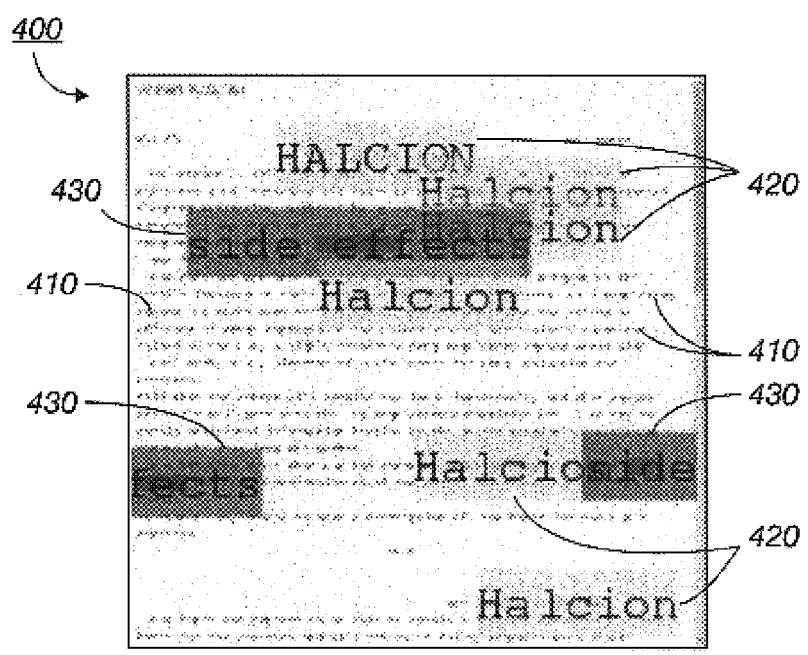
FIG. 5 is a second exemplary embodiment of a desaturated color document with the text being displayed using callouts and/or overlays according to this invention.

FIG. 4 illustrates a first exemplary embodiment of a document 360 with selected text enlarged and highlighted. The background 370 presents a desaturated web page. A number of yellow highlights 380 contain the text "recipe", while a number of red highlights 390 contain the text "pound cake", as determined from a search engine seeking confectionary procedures. FIG. 5 illustrates a second exemplary embodiment of a document 400 with selected text enlarged and highlighted. The background 410 presents a desaturated web page. A number of yellow highlights 420 contain the text "halcion", while a number of red highlights 430 contain the text "side effects", as determined from a search engine applied for pharmacology.

As illustrated in FIGS. 3–5, different highlight colors can be chosen for each document within a corpus of documents, such as a web page, rather than a single selection uniformly applied over the corpus. In addition, a search in three-dimensional space can be performed for the best colors, for the best saturation, or for particular pre-chosen candidate colors. The degree of "pop out" might also be presented by a slider bar, to allow the observer to select the tradeoff between readability and saliency. Because web pages can be viewed on various document monitors driven by a variety of software drivers installed on sundry platforms, reliance on calibration of such monitors should be tempered with caution, so that user preferences can be accommodated by user-operated tailoring of criteria.

For a discretized region, such as a group of m pixels on a computer monitor, each pixel can be described by series quantity $x_i$ from pixels i=1, 2, ..., m. While the quantity $x_i$ can correspond to a scalar value for a single characteristic feature, a series j=1, 2, ..., n might be used for n different color parameters for color applications. The color space representing the pixel group can be expressed in an n×m matrix form of n rows and m columns. The pixel quantities $x_{ij}$ for L*a*b* colors, in three orthogonal coordinates, can be represented by a 3×m matrix of elements:

$$x = \begin{bmatrix} x_{1L} & x_{2L} & \cdots & x_{mL} \\ x_{1a} & x_{2a} & \cdots & x_{ma} \\ x_{1b} & x_{2b} & \cdots & x_{mb} \end{bmatrix}. \quad (1)$$

In various exemplary embodiments, once the colors appearing in that discretized region are represented, an arithmetic mean $\mu$ of those color values can be determined. In various exemplary embodiments, the mean $\mu$ can represent a median, a mode, a midpoint of the variation range, or an alternative statistical measure of location, and in the context of this specification should be treated broadly. In various exemplary embodiments for the discretized region, the mean $\mu$ corresponds to the average of the color elements $x_i$ that appear in the pixel group, and can include both background and distractors within that discretized region.

In various exemplary embodiments, although the mean $\mu$ can correspond to a scalar value for a single characteristic feature, the mean $\mu$ for color is characterized, as a vector or single column matrix having a plurality of n rows. Each scalar element within the n×1 vector may be denoted as $\mu_j$ by a color coordinate subscripts from 1, 2, ..., n corresponding to $\mu_1, \mu_2, \ldots, \mu_n$. The mean $\mu_j$ can be determined from the pixel quantities $x_i$, separately for each color coordinate j, as:

$$\mu_j = \frac{1}{m} \sum_{i=1}^{m} x_{ij}. \quad (2)$$

In various exemplary embodiments, weighting factors $\omega$ can be assigned for selected portions of the region represented by the mean $\mu$ of the region. For a text of the discretized region that is surrounded by a highlight region, the color variables for the highlight region should contrast against the background, but should also avoid obscuring the foreground text. The background of the discretized region may have low chroma, i.e., may be desaturated, while the highlight region may have low opacity, i.e., translucence, to ensure text readability. The effects of distractors on the ability of the viewer to distinguish the highlight region from the background can be emphasized by according greater weight to distractor pixels than to other background pixels. Consequently, quantities for each coordinate at each pixel of the discretized region can be multiplied by a weighting function based on a pixel characteristic for each weighting factor. Also, a bias factor ξ can be added to adjust for noise. The weighted mean $\mu_j$ for each color coordinate can be determined from the weighted pixel quantities $\omega_i x_i$ and biases ξ, separately for each color coordinate j, as:

$$\mu_j = \frac{1}{m}\sum_{i=1}^{m} \omega_{ij} x_{ij} + \xi_j. \tag{3}$$

For L*a*b* colors, in three orthogonal coordinates, the mean μ can be represented by a 3×1 vector matrix for the j coordinates. In various exemplary embodiments, the mean in this color space can be quantified by values of L* as $\mu_L$, a* as $\mu_a$ and b* as $\mu_b$. In various exemplary embodiments, this vector matrix for L*a*b* colors is:

$$\mu = \begin{bmatrix} \mu_L \\ \mu_a \\ \mu_b \end{bmatrix}. \tag{4}$$

Additionally, a covariance Σ of the colors can be determined that quantifies the variation of color within the space. In general, the covariance Σ represents a measure of correlation between the quantities around the mean μ. More generally, however, the covariance Σ provides a measure of the spread or variability of the quantities about the mean μ. An appropriate measure for the covariance Σ can provide both a magnitude and a directionality to that spread. In various exemplary embodiments, for variables j and k within the n-dimensioned color space, the covariance elements $\Sigma_{jk}$ can be expressed as:

$$\sum_{jk} = \frac{1}{m-1}\sum_{i=1}^{m}(x_{ij} - \mu_j)(x_{ik} - \mu_k). \tag{5}$$

As with the mean μ, the covariance Σ can correspond to a scalar value. However, in various exemplary embodiments, the covariance Σ is characterized as an n×n matrix, sometimes denoted as a tensor array. Each element value $\Sigma_{jk}$ within the n×n matrix may be denoted by a double-subscript of coordinates j and k from 1, 2, . . . , n corresponding to elements $\Sigma_{11}, \Sigma_{12}, \ldots \Sigma_{1n}, \Sigma_{21}, \Sigma_{22}, \ldots, \Sigma_{2n}, \Sigma_{n1}, \Sigma_{n2}, \ldots, \Sigma_{nn}$. Positive correlation between coordinates j and k is indicated by covariance values greater than zero. This corresponds to pixel values that increase in the positive j direction and also increase in the positive k direction. Similarly, negative correlation is indicated by covariance values less than zero, while independence between coordinates j and k is indicated by zero covariance.

In various exemplary embodiments, an internal noise term can also be added to the covariance Σ on the right-hand side of Eq. (5). Such a bias term ξ can account for the noise apparent in the human visual system. For L*a*b* colors, this noise term can be adequately approximated. This noise term can represent noise in the human visual system's observations of displayed features. Additionally, adding noise can also ensure that the covariance matrix is invertible by providing values in the covariance elements that avoid a zero or near-zero determinate. Weighting factors ω can also be applied to selected covariance elements.

The covariance referred to in Eq. (5) represents a best-fit ellipsoid around the quantities, i.e., about the set of features in the region. In various exemplary embodiments, the covariance can be a maximum absolute difference $|x_{ij}-x_{ik}|$ for all values of i=1, 2, . . . , m and j, k=1, 2, . . . , n. In various exemplary embodiments, the covariance can be a different function to characterize the spread, such as a Euclidean distance between the quantities. This Euclidean distance can be expressed as elements $D_{ij}$ in a Euclidean matrix D as:

$$D_{jk} = \sqrt{\sum_{i=1}^{m}(x_{ij} - x_{ik})^2}. \tag{6}$$

In various exemplary embodiments, the first row of the covariance Σ matrix can be quantified by values of L* with respect to itself as $\Sigma_{LL}$, and with respect to a* as $\Sigma_{La}$ and b* as $\Sigma_{Lb}$. Similar quantification of the second and third rows leads to one exemplary embodiment of a covariance matrix for L*a*b* colors of the form:

$$\sum = \begin{bmatrix} \sum_{LL} & \sum_{La} & \sum_{Lb} \\ \sum_{aL} & \sum_{aa} & \sum_{ab} \\ \sum_{bL} & \sum_{ba} & \sum_{bb} \end{bmatrix}. \tag{7}$$

While the mean μ and covariance Σ characterize the region, the color of a target T is characterized by an n×1 matrix or vector of the same dimension as the mean μ. In various exemplary embodiments, the saliency is defined as the Mahalanobis distance Δ of a particular target color T compared to the mean μ of the distractor distribution in the background of the region. The spread of the distribution can be represented by the covariance Σ or by the Euclidean distance D, or by any other appropriate known or later developed measure of the spread of data.

The Mahalanobis distance Δ can be expressed as a series of matrix multiplication operations for a color-choosing method. In various exemplary embodiment, the saliency expression can be determined from the square of the Mahalanobis distance Δ as:

$$\Delta^2 = (T-\mu)'\Sigma^{-1}(T-\mu) \tag{8}$$

The vector difference (T−μ) represents the contrast between the target T and the region mean μ for each of the respective vector components from Eq. (4) and forms an n×1 matrix or vector. For L*a*b* colors, the vector can be written as:

$$(T - \mu) = \begin{bmatrix} T_L - \mu_L \\ T_a - \mu_a \\ T_b - \mu_b \end{bmatrix}. \tag{9}$$

The transpose of this vector difference $(T-\mu)'$ from Eq. (9) yields a 1×n compliment, forming a single row matrix. For a scalar difference, the transpose would be itself. For L*a*b* colors, the transpose is:

$$(T-\mu)'=[T_L-\mu_L T_a-\mu_a T_b-\mu_b]. \quad (10)$$

In various exemplary embodiments, the difference $(T-\mu)$, whether vector or scalar, represents a minimum distance between the target and the distractors. In various other exemplary embodiments, the difference $(T-\mu)$ can be other functions representing a difference between the target and the distractors, for instance a maximum distance between the target and the distractors.

The matrix inverse $\Sigma^{-1}$ of the covariance $\Sigma$ can be determined by matrix inversion techniques. For a scalar covariance $\Sigma$, the inverse is the reciprocal of the base scalar covariance $\Sigma$. The saliency, expressed by the Mahalanobis distance $\Delta$, is the transpose of the vector difference, multiplied by the inverse of the covariance, in turn multiplied by the vector difference. These matrix multiplications in Eq. (8) result in a scalar product $\Delta^2$ for the square of the Mahalanobis distance.

The greater the saliency value calculated using this technique, the higher the probability that the target color T draws the observer's attention when appearing in a background display of colors having the mean $\mu$ and the covariance $\Sigma$. In various exemplary embodiments, as a measure of target saliency, essentially the number of standard deviations between the target feature vector and the mean distractor feature vector are used. Thus, the more salient the target, i.e., the greater the Mahalanobis distance $\Delta$, the more easily an observer can notice or find the target among the background of distractors.

In various exemplary embodiments, the saliency can alternatively be measured by other techniques, such as by wavelet-based salient point detection or alternative filtering technique. In various exemplary embodiments, characterizations for scalar operations are based on the difference, such as $(T-\mu)$, minus spread such as covariance $\Sigma$, and the difference divided by the spread. In various other exemplary embodiments, the saliency can be determined based on the difference multiplied by the inverse of the spread in matrix form. In various exemplary embodimenets, positive weighting is applied to the difference and negative weighting is applied to the spread.

For L*a*b* colors, for example, a high level of saliency can be identified by comparing color characteristics of the target T and the mean $\mu$ of the region about a midpoint, without performing the full saliency determination as outlined in Eq. (4) through Eq. (8). For example, in various exemplary embodiments, the lightness L* ranges from black (zero) to white (one-hundred), with a midpoint at neutral gray (fifty). Both a* and b* axes have zero midpoints, which are associated with no chroma.

Thus, if a background has a high mean lightness, i.e., $\mu_L>50$, then a high value for the saliency corresponds to a low target lightness, i.e., $T_L<50$, and vice versa. Similarly, if a background mean is green, i.e., $\mu_a<0$, and yellow, i.e., $\mu_b>0$, then a high value for the saliency corresponds to a target that is more red, i.e., $\mu_a>0$ and/or blue, i.e., $\mu_b<0$, and vice versa. Consequently, a first estimate for a saliency target color could include, for example, values as $T_L=100-\mu_L$, $T_a=-\mu_a$, and $T_b=-\mu_b$.

The mean $\mu$ can use one or more weighting factors $\omega$ to adjust the measure of the region against which the saliency of the target T is to be compared. For the highlighted text example, the lightness L* could be used to emphasize the highlight, while the hue values a* and b* could be used to emphasize the background. In various exemplary embodiments, the highlight can be treated as a first target, while the text can be treated as a second target with preselected color characteristics. Concatenated saliency comparisons could then be used to select, and ideally optimize, the highlight color. The one or more weighting factors could also be used to account for the tendency for spatially neighboring colors to have more effect on the saliency of the target color than colors that are spatially more distant from the target.

Figure 6:
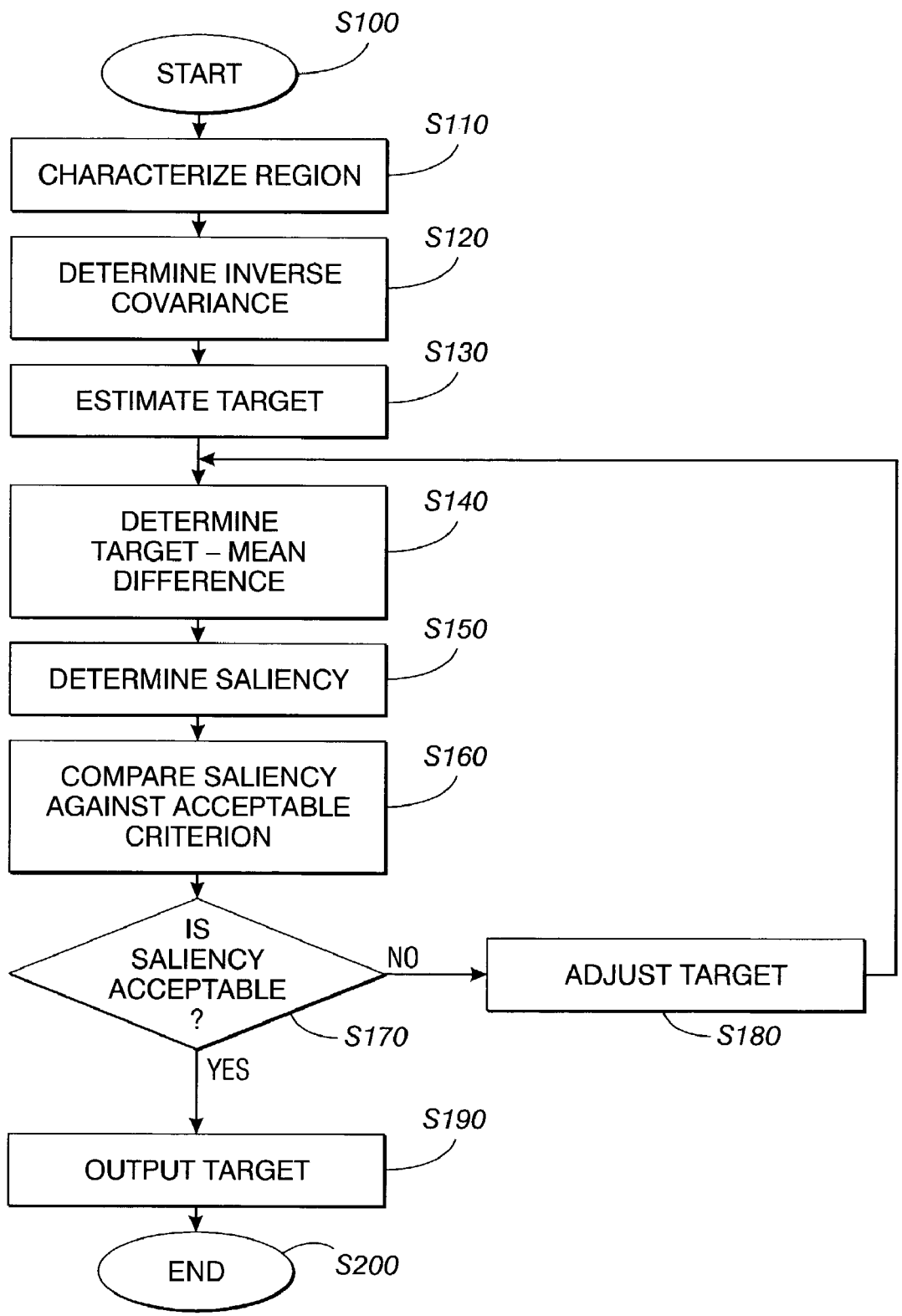
FIG. 6 is a flowchart outlining one exemplary embodiment of a method for according to this invention.

FIG. 6 is a flowchart outlining one exemplary embodiment of a method for color selection in a region. Beginning in step S100, operation continues to step S110, where a region is characterized and an arithmetic mean $\mu$ is determined for the region. Next, in step S120, an inverse covariance $\Sigma$ is determined. Then, in step S130, an initial estimate for a target vector T is determined, optionally based on the mean $\mu$. In various exemplary embodiments, the initial estimate is determined by subtracting double the mean coordinate from a corresponding midpoint of a coordinate. Operation then continues to step S140.

In step S140, a difference $(T-\mu)$ is determined. In various exemplary embodiments, such as, for example, when the difference is defined as a vector, the difference $(T-\mu)$ is also transposed. Then, in step S150, the Mahalanobis distance $\Delta$ is determined as the scalar measure for saliency of the target T within the region. Next, in step S160, the determined saliency is compared to an acceptance criterion. Then, in step S170, a determination is made whether the comparison indicates that the saliency is acceptable. If the saliency is not acceptable, operation continues to step S180. Otherwise, operation jumps to step S190.

In various exemplary embodiments, the square of the Mahalanobis distance $\Delta$ is determined using matrix multiplication. In various other exemplary embodiments, the square of the Mahalanobis distance $\Delta$ is determined by scalar operations. In various exemplary embodiments, the square-root of the resulting squared Mahalanobis distance $\Delta^2$ value quantifies the saliency.

In step S180, the target value is adjusted. In various exemplary embodiments, the target value is adjusted by incremental changing the target value along at least one coordinate. Such incremental changes can be performed based on differences between the current target value and the mean p of coordinate values in the color space. Alternatively, the target value can be varied randomly. It should be appreciated that the new candidate target value may be chosen according to any desired appropriate technique. Operation then returns to step S140. This process repeats indefinitely until the saliency satisfies the acceptance criterion. Alternatively, this process can be interrupted after exceeding a predetermined process condition, with an accompanying status message and/or the current target value. In contrast, in step S190, the target value determined in step S130 or step S180 is output. If the saliency satisfies more than one criterion or all criteria, the current target value satisfying the criteria is output. Operation then continues to step S200, where operation of the method terminates.

FIG. 7 is a flowchart outlining in greater detail one exemplary embodiment of the method for characterizing the region step S110. As shown in FIG. 7, operation begins in step S110, and continues to step S112, where the region is discretized. Next, in step S114, the mean of the characteristic for the discretized region is determined. Operation then returns to step S120. It should be appreciated that, if descritizing the region is not desired, step S112 can be omitted.

FIG. 8 is a flowchart outlining in greater detail one exemplary embodiment of the method for determining the inverse covariance of step S120. As shown in FIG. 8, operation begins in step S120, and continues to step S122, where the covariance $\Sigma$ is determined. Next, in step S124, the inverse $\Sigma^{-1}$ of the covariance $\Sigma$ is determined. Operation then returns to step S130.

FIG. 9 is a flowchart outlining in greater detail one exemplary embodiment of the method for determining the differences (T–µ) step S140. As shown in FIG. 9, operation of the method begins in step S140, and continues to step S142, where the difference (T–µ) between the target characteristic T and the mean characteristic µ is determined. Next, in step S144, the transpose (T–µ)' of the difference is determined. Operation then returns to step S150. It should be appreciated that step S144 is particularly useful if the difference (T–µ) is a vector. However, it should be appreciated that step S144 is optional and thus can be omitted.

These methods can also be applied to producing a web-safe color palette by producing a small collection of colors that perform such functions adequately on all platforms. See, for example, the web pages under URL addresses www.slashdot.org/articles/00/09/08/1622204.shtml and www.hotwired.lycos.com/webmonkey/00/37/index2a.html?tw=design.

In various exemplary embodiments, the systems and methods for choosing color according to this invention exploits traits within human vision to find a particular target that displays characteristics that distinguish the target from distractors within a background. This characterization of the observer's visual search can be labeled stimulus-driven attraction, from the features of the stimulus, as distinct from those items that draw attention due to their potential semantic value for the observer. The saliency in some exemplary embodiments of the color-choosing systems and methods according to this invention represents a useful measure for stimulus-driven attraction.

In a first example, a selection of highlight colors for a web page text is chosen. The highlight colors should draw the observer's attention, while the highlighted text should also be readable. For example, the highlighted text should be legibly distinct against the highlight. These are conflicting demands on the highlight colors.

Without loss of generality, consider black text, which is most readable against a light, desaturated background. However, the human visual response predicts that saturated colors are the best for drawing attention. A decision can be made to emphasize readability as more crucial than drawing attention. Consequently, colors may be selected with reduced, and ideally, the minimum, saturation required to draw the observer's attention.

In various exemplary embodiments, the systems and methods for choosing useful colors according to this invention starts with a list of possible candidate hues. In an experimental example, to minimize the set of colors for a wide variety of web pages the mean µ and covariance $\Sigma$ of the colors were determined for a set of twenty selected "typical" web pages. The saturation of the candidate hues was increased, until the resulting saliency of each color was 3.5. The saliency value of 3.5 was selected based, on theoretical reasons as a 2.5, base value of representing an applicable threshold for a color to "pop out", plus a margin for error. With L*a*b* colors, this entails increasing the absolute values of a* and/or b*, while maintaining L* constant. Selecting a reduced, and minimum, saturation that achieves a given saliency allows the systems and methods to balance both the criterion that the highlight colors draw the observer's attention, and the criterion that black text be readable against those highlight colors.

Surrounding an object by a thin outline represents another application for automatic color selection, as shown in the following examples. FIGS. 10–15 present a photograph 500 in an electronic museum guidebook containing a collection of objects that are outlined, as described herein. The outline must exhibit a target color to draw the observer's attention against an often saturated background selecting a target color can be further complicated by large variations in the background and/or among the objects to be outlined.

FIG. 10 shows a photograph 500 having a background 505 that includes lighter and darker regions. Consequently, the covariance values $\Sigma$ for the photograph 500 are higher than for the desaturated documents 360 and 400 shown in FIGS. 4 and 5, respectively. Additionally, the outlined objects 510, 520, and 530, which should draw an observer's attention, exhibit large variations among themselves. In particular, the outlined objects include items 510 surrounded by a dark background, items 520 surrounded by a mixed background, and items 530 surrounded by a light background.

In the examples shown in FIGS. 10–15, the color-choosing systems and methods according to this invention determine the mean µ and the covariance $\Sigma$ for the background 505 and the objects 510–530 were analyzed. To select the colors, the set of candidate colors for the outline as the target T. In these examples shown in FIGS. 10–15, the hues for the outlines for all of the candidate colors were highly saturated to maximize Mahalanobis distance $\Delta$ for the outline.

Figure 15:
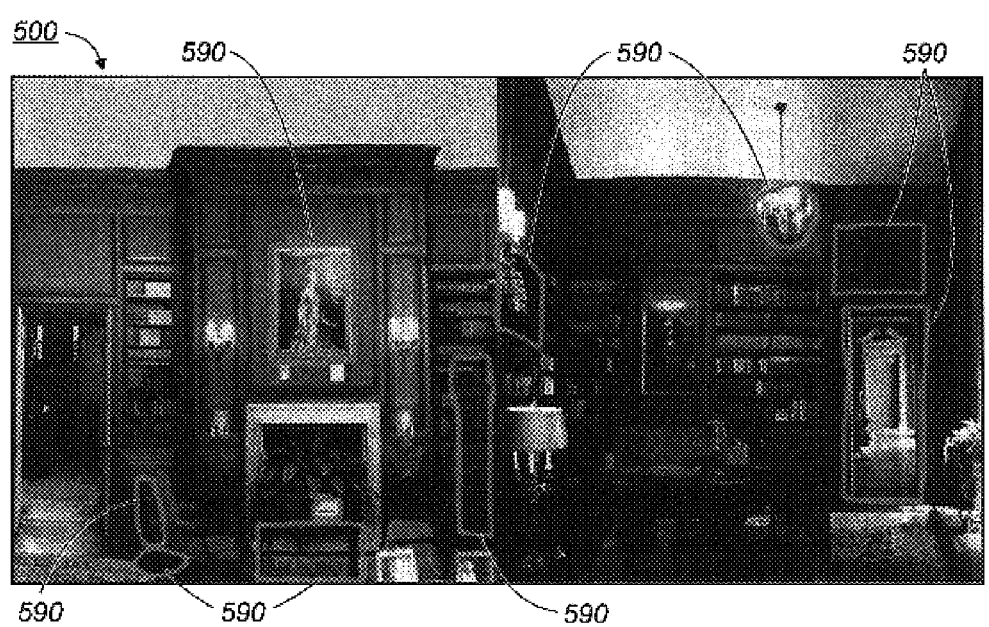
FIG. 15 is a third exemplary embodiment of a photograph having outlines around selected objects, according to this invention where the selected color is determined to be a good choice.

FIGS. 10, 11 and 12 represent colors for the outline that were determined to be poor choices, i.e., choices that do not draw the observer's attention. By contrast, FIGS. 13, 14 and 15 represent colors that were determined to be good choices, i.e., colors that draw the observer's attention. FIG. 10 surrounds the objects 510, 520 and 530 with an orange outline 540. FIG. 11 surrounds these objects with a cyan outline 550. FIG. 12 surrounds these objects with a red outline 560. FIG. 13 surrounds these objects with a blue outline 570. FIG. 14 surrounds these objects with a pink outline 580. FIG. 15 surrounds these objects with a green outline 590.

A casual observer would likely agree that the orange outline 540 and the red outline 560 represent poor selections, in part for the limited contrast in hue against the warm-color background 505 in the photograph 500. The same observer might be less persuaded that the cyan outline 550 constitutes a poor choice. Additionally, the observer would likely also agree that the pink outline 580 and the green outline 590 strongly draw the observer's attention, while remaining skeptical that the blue outline 570 is a good choice. Calibrating the display device used to view the image can enhance the saliency of colors from a human visual-response perspective.

The color-choosing systems and methods show proficiency in determining colors attracting attention that "clash" or contrast with colors in the background scene. An optional user selection can be included to enable controlled change of desired saliency of the chosen color. The saliency determination can thus be inverted to select colors that compliment other adjacent colors.

The saliency can be determined as a color chooser. A heuristic can be used to guess a good color followed by an optimization procedure to pick the color, with saliency as the goodness measure for the optimization. In various exemplary embodiments, a set of candidate colors may already be established for testing the saliency of those candidates and pick those with highest saliency or saliency over some threshold. In various exemplary embodiments, rather than picking colors, a color might already be chosen, and the method would rate the saliency of that color. In further exemplary embodiments, search is confined only to within a limited range of color space, such as for changing only the saturation of a color, and looking a color with saliency above an established threshold (e.g., >3.5). For example, a "green" with high saliency could be sought, thereby restricting the search within hues known to appear "green" (roughly corresponding to the negative a- region in L*a*b* colors). Finally, saliency might be only one component of the optimization function. Colors might be good for other reasons as well. One example includes readability of black text against the highlight color.

Figure 16:
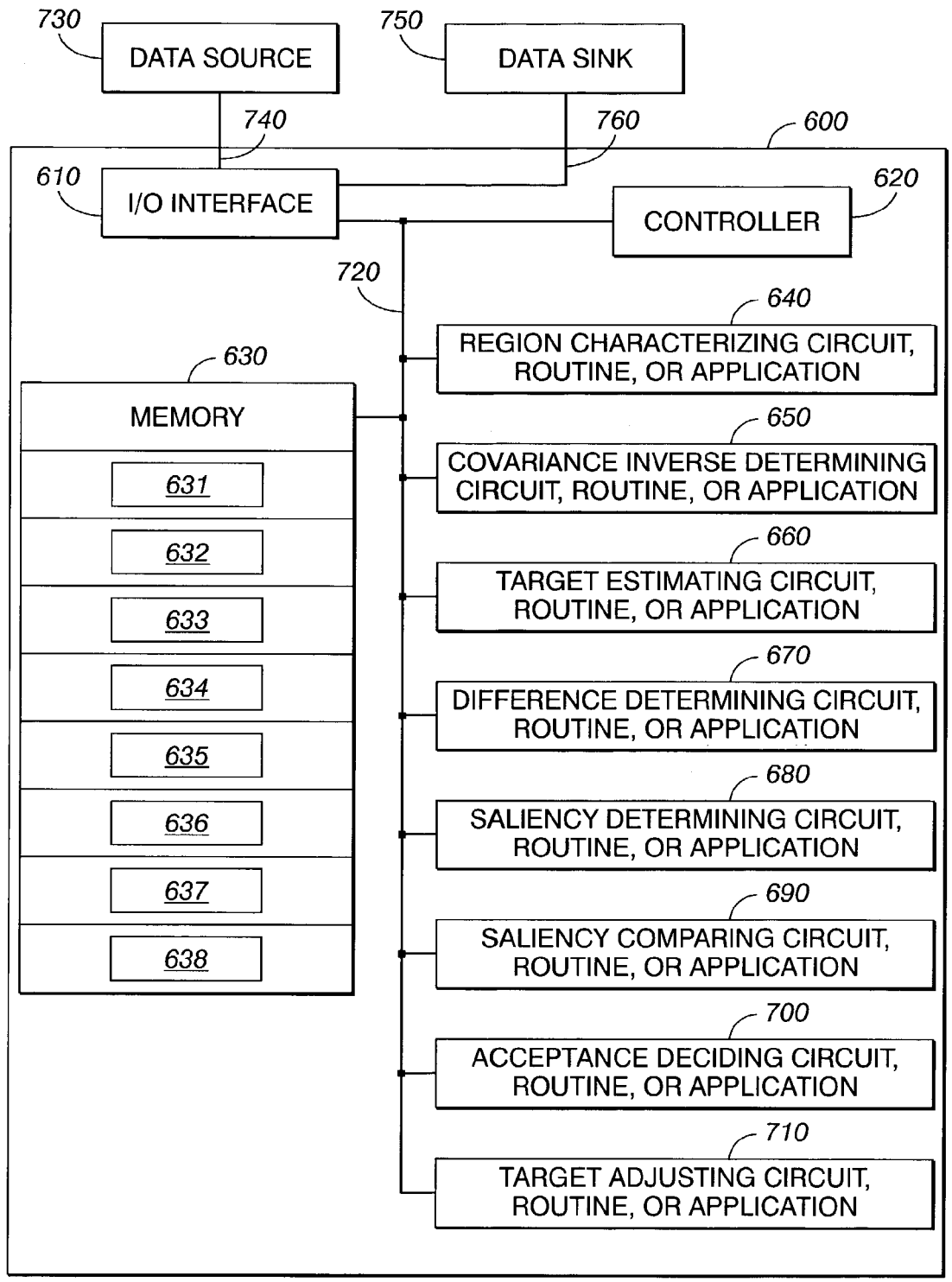
FIG. 16 is a block diagram of one exemplary embodiment of a system according to this invention.

FIG. 16 is a block diagram outlining one exemplary embodiment of a visual characteristics choosing system 600 according to this invention. As shown in FIG. 16, the visual characteristics choosing system 600 includes one or more of an input/output (I/O) interface 610, a controller 620, a memory 630, a region characterizing circuit, routine or application 640, a covariance inverse determining circuit, routine or application 650, a target estimating circuit, routine or application 660, a difference determining circuit, routine or application 670, a saliency determining circuit, routine or application 680, a saliency comparing circuit, routine or application 690, an acceptance deciding circuit, routine or application 700, and/or a target adjusting circuit, routine or application 710, each interconnected by one or more control and/or data busses and/or one or more application programming interfaces 720.

The input/output interface 610 interacts with the outside of the visual characteristics choosing system 600. For example, the input/output interface 610 receives an image from an image data source 730 over a link 740. The input/output interface 610 also outputs a revised image and/or one or more instructions for and/or information about revising an image to an image sink 750 over a link 760. The input/output interface 610 may also be connected to one or more user input devices and/or one or more output devices, such as an interactive document, or the like.

In various exemplary embodiments, the data source 730 can be integrated with the visual characteristics choosing system 600, such as in a digital optical character recognizer having an integrated image receiver, such as a scanner. In various other exemplary embodiments, the image data source 730 can be connected to the input/output interface 610 over the link 740. The link 740 can be implemented using a connection device such as a modem, a local area network, a wide area network, an intranet, the Internet, and any other distributed processing network, or any other known or later-developed connection structure.

It should be appreciated that, while the electronic image data can be generated at the time of decoding a document image from an original physical document, the electronic image data could have been generated at any time in the past. The image data source 730 is thus any known or later-developed source which is capable of supplying electronic image data to the input/output interface 610. For example, the image data source 730 may be a data carrier such as a magnetic storage disk, CD-ROM or the like, or a host computer that contains scanned image data. Thus, the image data source 730 can be any known or later-developed source that is capable of providing image data to the visual characteristics choosing system 600 according to this invention.

The data sink 750 can be any known or later-developed device that is capable of receiving a recognized output by the visual characteristics choosing system 600 and either storing, transmitting or displaying the solutions. In various exemplary embodiments, the data sink 750 can be integrated with the visual characteristics choosing system 600. In various other exemplary embodiments, the data sink 750 can be connected to the input/output interface 610 over a link 760. The link 760 can be implemented using a connection device such as a modem, a local area network, a wide area network, an intranet, the Internet, and any other distributed processing network, or any other known or later-developed connection device.

The image data source 730 can be any one of a number of different sources, such as a digital copier, a facsimile device, a digital camera, a scanner, or a locally or remotely located computer, or any other known or later-developed device that is capable of generating electronic image data. Similarly, the data source 730 can be any suitable device that stores and/or transmits electronic image data, such as a client or a server of a network or the Internet, and especially the World Wide Web.

In various exemplary embodiments, inputs and outputs can present an image or provide instructions for producing an image. Coded instructions can be written in a description language to describe the document format. Hence, an input or an output can present a pixel rendering or command text. In particular, the output can be a specification of a color or colors (such as coordinates in color space), a measure of saliency, etc. A variety of description languages can be used to provide instructions for displaying color in a document image.

The memory 630 stores information received from the input/output interface 610, such as image data received by the input/output interface 610. The memory 630 also stores information and/or data from various ones of the circuits, routines or applications 640–710 of the visual characteristics choosing system 600. The memory 630 can be implemented using any appropriate combination of alterable, volatile or non-volatile memory or non-alterable or fixed, memory. The alterable memory, whether volatile or non-volatile, can be implemented using any one or more of static or dynamic RAM, a floppy disk and disk drive, a writeable or re-writeable optical disk and disk drive, a hard drive, flash memory or the like. Similarly, the non-alterable or fixed memory 630 can be implemented using any one or more of ROM, PROM, EPROM, EEPROM, an optical ROM, such as a CD-ROM or DVD-ROM disk and disk drive or the like.

As shown in FIG. 16, the memory 630 includes one or more of a region characterizing portion 631, which stores region characterizing result; a covariance inverse determining portion 632, which stores covariance inverse determining result; a target estimating portion 633, which stores a target estimating result; a difference determining between target and mean portion 634, which stores a difference determining between target and mean result; a saliency determining portion 635, which stores a saliency determining result; a saliency comparing portion 636, which stores a saliency comparing result; an acceptance deciding portion 637, which stores an acceptance deciding result; and a target adjusting portion 638, which stores a target adjusting result.

The one or more control and/or data busses and/or application programming interfaces 720 provide communication and data transfer among various ones of the circuits, routines or applications 640–710 of the visual characteristics choosing system 600. The controller 620 provides instructions to various ones of the circuit, routine or application 640–710 of the visual characteristics choosing system 600.

The region characterizing circuit, routine or application 640 explores partial paths and searches for solutions and determines the mean μ of the region. The covariance inverse determining circuit, routine or application 650 determines the inverse covariance of the region, represented as a matrix or as a scalar in various exemplary embodiments. The target estimating circuit, routine or application 660 estimates a target value T for each coordinate in the color space. The difference determining circuit, routine or application 670 determines a difference between the target and the mean of the region. The difference transpose can also be determined, accordingly.

The saliency determining circuit, routine or application 680 determines the saliency based on the covariance and the determined difference. The saliency comparing circuit, routine or application 690 compares the saliency with an acceptance criterion. The acceptance deciding circuit, routine or application 700 decides whether to adjust the target based on the results put out by the saliency comparing circuit, routine or application 690. The acceptance deciding circuit, routine or application 700, based on the comparison result from the saliency comparing circuit, routine or application 690 or either stops further iteration of the target and outputs the target through the input/output interface 630, or directs the target adjusting circuit, routine or application 710 to adjust the target values within the color space. In one or more exemplary embodiments, the acceptance deciding circuit, routine or application 700 can also receive input from alternative sources and assess conditions apart from the saliency.

The input/output interface 610 outputs the target that satisfies the acceptance criterion. In various exemplary embodiments of the operation of the visual characteristics choosing system 600 according to this invention, the visual characteristics choosing system 600 shown in FIG. 16 generates, for example, a displayed color, element values of coordinates in a color space and/or a recognized text string to represent target information for a received color region.

Figure 17:
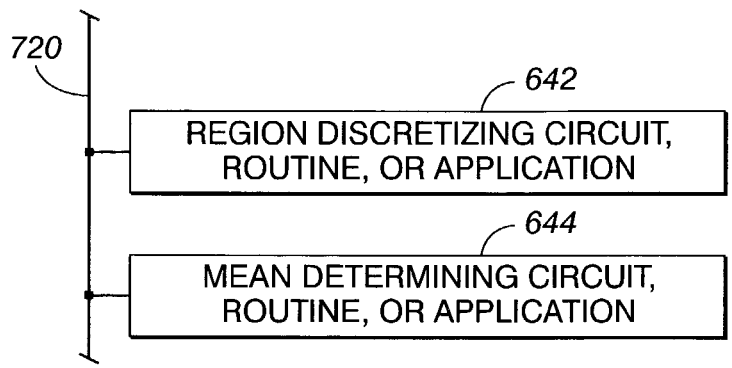
FIG. 17 is a block diagram in greater detail of one exemplary embodiment of a system within FIG. 16 according to this invention.

FIG. 17 is a block diagram in greater detail of one exemplary embodiment of a system from FIG. 16 as shown in FIG. 17, the functionality of the region characterizing circuit, routine or application 640 can be performed by a region discretizing circuit, routine or application 642 and a mean determining circuit, routine or application 644, each interconnected by one or more control and/or data busses and/or one of more application programming interfaces 720.

Figure 18:
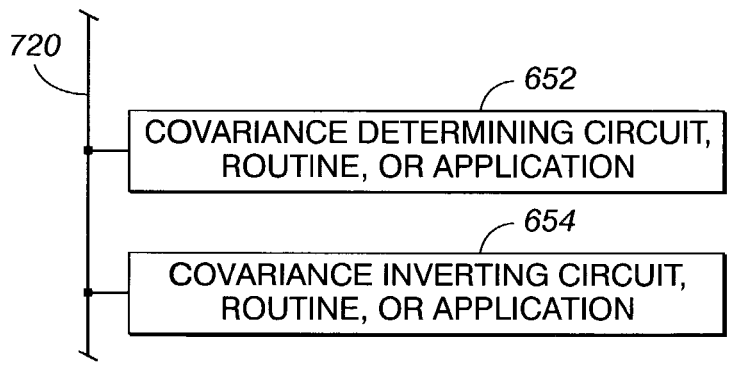
FIG. 18 is a block diagram in greater detail of one exemplary embodiment of a system within FIG. 16 according to this invention.

FIG. 18 is a block diagram in greater detail of one exemplary embodiment of a system from FIG. 16. As shown in FIG. 18, the functionality of the covariance inverse determining circuit, routine or application 650 can be performed by a covariance determining circuit, routine or application 652 and a covariance inverting circuit, routine or application 654, each interconnected by one or more control and/or data busses and/or one or more application programming interfaces 720.

Figure 19:
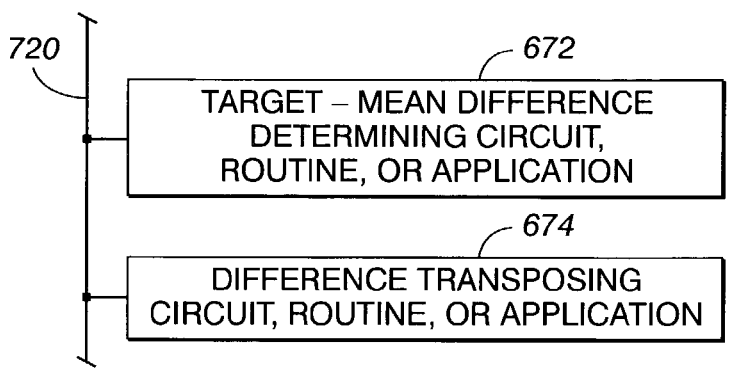
FIG. 19 is a block diagram in greater detail of one exemplary embodiment of a system within FIG. 16 according to this invention.

FIG. 19 is a block diagram in greater detail of one exemplary embodiment of a system from FIG. 16. As shown in FIG. 19, the functionality of the difference determining between target and mean circuit, routine or application 670 can be performed by a differencing between target and mean circuit, routine or application 672 and a difference transposing circuit, routine or application 674, each interconnected by one or more control and/or data busses and/or one or more application programming interfaces 20.

In the visual characteristics system 600, shown in FIG. 16, is based on human vision research on criteria that determine whether a color "pops out" and appears to draw an observer's attention. In various exemplary embodiments, an automatic system for selecting appropriate colors, as disclosed, provides an improvement over current manual selection for various tasks, such as highlighting objects for both noticeability and legibility of the highlighted subject, and for blending into the surroundings.

The visual characteristics choosing system 600 is, in various exemplary embodiments, implemented on a programmed general purpose computer. However, the visual characteristics choosing system 600 can also be implemented on a special purpose computer, a programmed microprocessor or microcontroller in peripheral integrated circuits, an ASIC or other integrated circuit, a digital signal processor, a hard wired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 6–9 can be used to implement the visual characteristics choosing system 600.

It should be understood that each of the circuits, routines and/or applications shown in FIG. 16 can be implemented as physically distinct hardware circuits within an ASIC, or using an FPGA, a PDL, a PLA or a PAL, a digital signal processor, or using discrete logic elements or discrete circuit elements. The particular form each of the circuits or routines shown in FIG. 16 will take is a design choice and will be obvious and predictable to those skilled in the art.

The system 600 can be a plurality of separate dedicated or programmable integrated or other electronic circuits or devices or implemented using a suitably programmed general purpose computer, either alone or in conjunction with one or more peripheral data and signal processing devices. In general, any device or assembly of devices on which a finite state machine capable of implementing the procedures described herein can be used as the system 600. A distributed processing architecture can be used for maximum data/signal processing capability and speed.

While this invention has been described in conjunction with exemplary embodiments outlined above, many alternatives, modifications and variations will be apparent to those skilled in the art. Accordingly, the exemplary embodiments of the invention, as set forth above, are intended to be illustrative, not limiting. Various changes can be made without departing from the spirit and scope of the invention.

What is claimed is:

1. A method for choosing visual characteristics of a characteristic space within a region, comprising:
    determining a saliency based on an inverse covariance of the region and a difference between a target characteristic and a mean characteristic of the region;
    comparing the saliency against at least one acceptance criterion;
    adjusting the target characteristic and repeating the determining the saliency and comparing the saliency steps if the saliency does not satisfy the at least one acceptance criterion; and
    outputting the target characteristic if the saliency satisfies the at least one acceptance criterion.

2. The method of claim 1, wherein the visual characteristics are colors and the characteristic space is a color space.

3. The method of claim 1, wherein determining a saliency comprises:
    determining a mean characteristic of the region;
    determining a covariance of the region;
    inverting the covariance to produce an inverse covariance;
    estimating a target characteristic;

determining a difference between the mean characteristic and the estimated target characteristic;

transposing the difference to produce a difference transpose; and determining a product of the difference transpose multiplied by the inverse covariance multiplied by the difference to produce the saliency.

4. The method of claim 3, wherein determining a covariance comprises determining a region distance between separate portions of the region.

5. The method of claim 4, wherein determining a covariance comprises determining at least one of a maximum distance and a Euclidean distance between the separate portions of the region.

6. The method of claim 3, wherein determining the mean characteristic comprises determining at least one of an arithmetic mean, a median, a mode and a range midpoint.

7. The method of claim 1, wherein determining a saliency comprises determining a Mahalanobis distance.

8. The method of claim 7, wherein determining a Mahalanobis distance comprises determining a sequence of:

$$\Delta^2 = (T-\mu)'\Sigma^{-1}(T-\mu), \text{ wherein}$$

$\Delta$ is the Mahalanobis distance,
T is the target characteristic,
$\mu$ is the mean characteristic, and
$\Sigma^{-1}$ is the inverse covariance.

9. The method of claim 1, wherein the characteristic space has a single coordinate, and the mean characteristic, the covariance and the target characteristic each have a scalar element.

10. The method of claim 1, wherein the characteristic space has a plurality of coordinates, the mean characteristic is a mean vector having mean vector elements, the covariance is a matrix having tensor elements, and the target characteristic is a target vector having target vector elements.

11. The method of claim 10, wherein determining the saliency includes multiplying a weighting factor to the mean characteristic in each vector element for each coordinate of the plurality of coordinates.

12. The method of claim 10, wherein determining the saliency includes adding a bias factor to the mean characteristic in each vector element for each coordinate of the plurality of coordinates.

13. The method of claim 10, wherein estimating the target characteristic comprises subtracting a vector element for a coordinate of the mean characteristic from a midpoint of the coordinate.

14. The method of claim 3, wherein determining the mean characteristic of the region includes determining a mean characteristic of an object within the region.

15. The method of claim 1, wherein adjusting the target characteristic comprises incrementally changing a vector element of the target characteristic.

16. The method of claim 15, wherein incrementally changing a vector element of the target characteristic includes increasing an element difference between the vector element of the target characteristic and a vector element of the mean characteristic for a coordinate of the plurality of coordinates.

17. The method of claim 10, wherein adjusting the target characteristic comprises incrementally changing a vector element of the target characteristic.

18. The method of claim 1, wherein outputting the target characteristic comprises adjusting a characteristic of a target to match the target characteristic.

19. The method of claim 1, wherein outputting the target characteristic comprises displaying the target characteristic as a recommendation for a target.

20. The method of claim 19, wherein displaying the target characteristic comprises displaying in a format of at least one of a text, a set of vector elements in the characteristic space, a characteristic map, or an area containing the target characteristic.

21. The method of claim 1, further comprising outputting one of either the target characteristic or a status message if the saliency does not satisfy the at least one acceptance criterion.

22. The method of claim 1, wherein
adjusting the at least one acceptance criterion comprises adjusting the at least one acceptance criterion if the saliency does not satisfy the at least one acceptance criterion; and
outputting the target characteristic comprises outputting the target characteristic if the saliency satisfies all of the at least one acceptance criterion.

23. The method of claim 1, wherein
adjusting the target characteristic comprises adjusting the target characteristic if the saliency does not satisfy all of the at least one acceptance criterion; and
outputting the target characteristic if the saliency satisfies all of the at least one acceptance criterion.

24. The method of claim 1, wherein outputting the target characteristic comprises outputting the target characteristic if a nontarget characteristic satisfies at least one nontarget acceptance criterion.

25. A method for choosing characteristics of a characteristic space within a region, comprising:
determining a mean characteristic of the region;
determining a covariance of the region;
inverting the covariance to produce an inverse covariance;
estimating a target characteristic;
determining a difference between the mean characteristic and the target characteristic;
transposing the difference to produce a difference transpose;
determining a saliency from a product of the difference transpose multiplied by the inverse covariance multiplied by the difference;
comparing the saliency against at least one acceptance criterion;
adjusting the target characteristic and repeating the determining the saliency and comparing the saliency steps if the saliency does not satisfy the at least one acceptance criterion; and
outputting the target characteristic if the saliency satisfies the at least one acceptance criterion.

26. A computer storage medium having executable software code, the executable software code including:
instructions for determining a saliency based on an inverse covariance of the region and a difference between a target characteristic and a mean characteristic of the region;
instructions for comparing the saliency against at least one acceptance criterion;
instructions for adjusting the target characteristic and repeating the determining the saliency and comparing the saliency steps if the saliency does not satisfy the at least one acceptance criterion; and
instructions for outputting the target characteristic if the saliency satisfies the at least one acceptance criterion.

27. The computer storage medium of claim 26, wherein the instructions for determining the saliency further include:

instructions for determining a mean characteristic of the region;

instructions for determining a covariance of the region;

instructions for inverting the covariance to produce an inverse covariance;

instructions for estimating a target characteristic;

instructions for determining a difference between the mean characteristic and the estimated target characteristic;

instructions for transposing the difference to produce a difference transpose; and instructions for determining a product of the difference transpose multiplied by the inverse covariance multiplied by the difference.

28. The computer storage medium of claim 26, wherein the visual characteristics are colors and the characteristic space is a color space.

29. The computer storage medium of claim 26, wherein the characteristic space has a plurality of coordinates, the mean characteristic is a vector having vector elements, the covariance is a matrix having tensor elements, and the target characteristic is a vector having vector elements.

30. The computer storage medium of claim 27, wherein the instructions for estimating the target characteristic comprise instructions for subtracting a vector element for a coordinate of the mean characteristic from a midpoint of the coordinate.

31. The computer storage medium of claim 26, wherein the instructions for determining a saliency comprise instructions for determining a Mahalanobis distance.

32. The computer storage medium of claim 31, wherein the instructions for determining a Mahalanobis distance comprise instructions for determining a sequence of:

$$\Delta^2 = (T-\mu)'\Sigma^{-1}(T-\mu), \text{ wherein}$$

$\Delta$ is the Mahalanobis distance,

T is the target characteristic, $\mu$ is the mean characteristic, and $\Sigma^{-1}$ is the inverse covariance.

33. A system for choosing visual characteristics of a characteristic space within a region, comprising:

a saliency determining circuit, routine or application usable to determine a saliency based on an inverse covariance of the region and a difference between a target characteristic and a mean characteristic of the region;

a comparing circuit, routine or application usable to compare the saliency against at least one acceptance criterion; and a characteristics adjusting circuit, routine or application usable to adjust the target characteristic if the comparing circuit, routine or application determines that the saliency does not satisfy the at least one acceptance criterion.

34. The system of claim 33, wherein the saliency determining circuit, routine or application includes:

a mean determining circuit, routine or application useable to determine a mean characteristic of the region;

a covariance determining circuit, routine or application usable to determine a covariance of the region;

an covariance inverting circuit, routine or application usable to invert the covariance to produce an inverse covariance;

a characteristic estimating circuit, routine or application usable to estimate a target characteristic;

a differencing circuit, routine or application usable to determine a difference between the mean characteristic and the target characteristic;

a transposing circuit, routine or application usable to transpose the difference to produce a difference transpose; and a product determining circuit, routine or application usable to determine a product of the difference transpose multiplied by the inverse covariance multiplied by the difference.

35. The system of claim 33, wherein the visual characteristics are colors and the characteristic space is a color space.

36. The system of claim 33, wherein the characteristic space has a plurality of coordinates, the mean characteristic is a vector having vector elements, the covariance is a matrix having tensor elements, and the target characteristic is a vector having vector elements.

37. The system of claim 34, wherein the characteristic estimating circuit, routine or application includes a subtracting circuit, routine or application usable to subtract a vector element for a coordinate of the mean characteristic from a midpoint of the coordinate.

38. The system of claim 33, wherein the saliency determining circuit, routine or application includes a Mahalanobis distance determining circuit, routine or application usable to determine a Mahalanobis distance.

39. The system of claim 38, wherein the Mahalanobis distance determining circuit, routine or application determines the Mahalanobis distance $\Delta$ as:

$$\Delta^2 = (T-\mu)'\Sigma^{-1}(T-\mu), \text{ where:}$$

T is the target characteristic, $\mu$ is the mean characteristic, and $\Sigma^{-1}$ is the inverse covariance.

* * * * *